March 24, 1931.  P. R. BASSETT  1,797,394

SIGNAL

Filed July 18, 1925

Inventor
PRESTON R. BASSETT.
By his Attorney
Herbert H. Thompson

Patented Mar. 24, 1931

1,797,394

UNITED STATES PATENT OFFICE

PRESTON R. BASSETT, OF BROOKLYN, NEW YORK, ASSIGNOR, BY MESNE ASSIGNMENTS, TO SPERRY GYROSCOPE COMPANY, INC., A CORPORATION OF NEW YORK

SIGNAL

Application filed July 18, 1925. Serial No. 44,636.

This invention relates to signalling systems for the guidance of dirigible craft at night and especially for the guidance of aircraft, such as those engaged in night air mail service, which are obliged to fly on a definite, predetermined course. More particularly the invention relates to signalling systems which serve not only to mark a point or position, which is the function of a lighthouse or similar apparatus, but also to indicate the predetermined direction of course to be followed. For this purpose I employ two different types of signals at the same station, said signals being readily distinguishable. One of said signals is adapted to indicate a position while the other of said signals is designed to indicate the course. I may employ a continuously-operating beam, which may be a continuously moving beam, for indicating position, and an intermittently-operating beam for indicating course, or I may use some other method of distinguishing the signals.

It is a further object of my invention to provide a plurality of visible signals of the type described above, all of which may comprise but a single light source.

It is a further object of my invention to provide a compound signalling device of the type described which may readily be constructed from the type of signalling structure now employed for such purposes, for example, in the night air mail service.

Further objects and advantages of this invention will become apparent in the following detailed description thereof.

In the accompanying drawings

Figure 1:
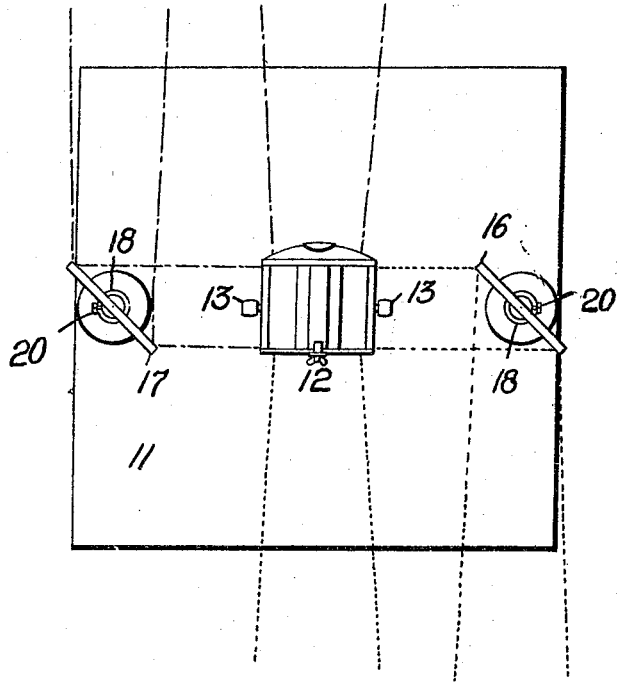
Fig. 1 is a plan view of a signalling station embodying my invention.
Figure 2:
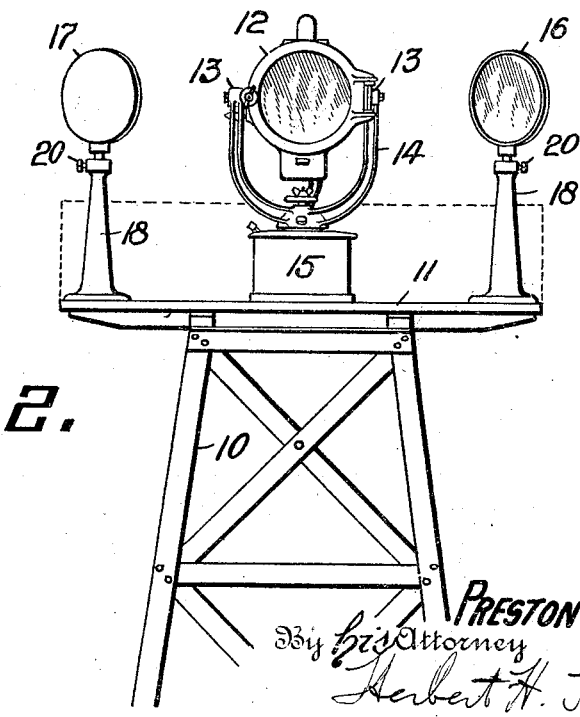
Fig. 2 is a front elevation thereof with parts broken away.

Referring to the drawings, there is disclosed a signalling station or tower 10 comprising an elevated platform 11, upon which is mounted a signal adapted to indicate position. This signal may take the form of a searchlight 12, mounted in horizontal trunnions 13 upon a frame 14, which is itself operable by any suitable means, such as a motor contained within casing 15, for rotation about a vertical axis. The searchlight may be adapted to be continuously rotated about said vertical axis to cast a beam continuously in azimuth. Such a beam traverses a wide horizon and is readily seen from a great distance in all directions radially from said station. An operator navigating a dirigible craft or an airplane at night is readily directed toward said station by this continuous signal. Hitherto, however, there has been nothing to indicate to the operator the course he is to travel from said signalling position, in the event that the said course is predetermined. This course would ordinarily be the course to be followed to the next signalling station. For this purpose, I prefer to utilize the same source of light which produces the position-indicating signal for producing also direction-indicating signals. I, therefore, mount upon the same platform 11 that supports the searchlight 12 a plurality of reflectors 16—17 supported in brackets 18 and adjustable about a vertical axis, the said reflectors being fixed in adjusted position by means such as lock-nuts 20. The reflectors 16 and 17 are of such height as to intercept the position-indicating beam in the travel of the latter in azimuth. The said reflectors are so positioned as to reflect the beam in opposite directions but in the line indicating the predetermined course which it is desired the operator shall follow. It will thus be apparent that in the travel of the beam of the searchlight 12 in azimuth, said beam will be intercepted by each of the reflecting surfaces 16—17 once in each revolution thereof to cast an intermittent beam in opposite directions along the desired course.

I have, therefore, provided two readily distinguishable signals, one for indicating position and the other for indicating the predetermined course. I have distinguished these signals by causing one to be continuous and the other intermittent but it is obvious that other means of distinguishing these two sets of signals may be employed. Also, it will be apparent that the number of reflecting surfaces 16—17 may be varied, depending upon the particular circumstances, and that one or more of said reflectors may be utilized to indicate the course toward the signal station 10, and other reflectors may be utilized to indicate the course to be followed outwardly from said station.

The apparatus described above is equally effective and operative where, in place of high intensity searchlight 12, there is employed a low intensity searchlight or an incandescent type searchlight, in which cases the beam itself is not visible at any substantial distance. The device is also effective and operative in those cases where the high intensity searchlight is employed, but conditions are such that the beam is not readily visible. Under any of these circumstances the operator would perceive a flash when the beam shone upon him. Thus, for example, in the rotation of searchlight 12, each time the beam from said searchlight intercepted the operator in azimuth, he would perceive a flash. If he did not perceive this flash, then he would maneuver until he came into the path of said beam. With the direction indicating device, if the operator flew upon the desired course, he would become aware of two successive flashes, one due to the beam from the searchlight 12 and the other due to the reflected beam from one of the reflectors 16—17. If, however, the operator was not flying on the predetermined course, he would perceive only the one flash from the searchlight 12 and he would know that he was off his course. The operator would maneuver until the second flash became visible in order to regain the proper course. Further, if the operator flew slightly off course he would not totally miss the flash due to the reflected beam but would perceive a flash of lesser intensity and duration than that due to the direct beam. In other words, a long flash would be followed by a short flash. In this case also the operator would maneuver until two full successive flashes were obtained periodically, that is, during each revolution of the searchlight 12.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device of the character described, in combination, continuously-operating means for transmitting a light beam to indicate position, intermittently-effective means for interrupting said first mentioned beam and transmitting a light beam to indicate direction, and a single source of light for both signals.

2. In a device of the character described, in combination, continuously-operating means for transmitting a light beam to indicate position and a plurality of intermittently-effective means for interrupting said first mentioned beam and transmitting a plurality of light beams in opposite directions to indicate direction.

3. In a device of the character described, in combination, continuously-operating means for transmitting a light beam, means for continuously revolving said beam, and a plurality of stationary means in the path of said beam adapted to reflect said beam in a direction to indicate a predetermined course.

4. In a device of the character described, in combination, a continuously-operating searchlight for transmitting a beam, means for continuously rotating said searchlight in azimuth, and a plurality of stationary reflecting surfaces in the path of said rotating beam for transmitting intermittent light beams, said reflecting surfaces being so positioned that said intermittent light beams indicate a predetermined course.

5. In a device of the character described, in combination, a searchlight having a source of light and a reflector for transmitting a beam of substantially parallel rays, means for rotating said searchlight continuously whereby said beam indicates position, and a reflector in the path of said rotating beam adapted to transmit a reflection of said beam once during each revolution thereof to indicate direction.

6. In a device of the character described, in combination, a searchlight having a source of light and a reflector for transmitting a beam of substantially parallel rays, means for rotating said searchlight continuously whereby said beam indicates position, and a plurality of reflectors in the path of said rotating beam each adapted to transmit a reflection of said beam once during each revolution thereof, said reflectors being positioned to transmit said reflections in opposite directions along a predetermined course.

7. In a device of the character described, in combination, a searchlight having a source of light and a reflector for transmitting a substantially horizontal beam of substantially parallel rays, beams for rotating said searchlight continuously whereby said beam indicates position, and a reflector in the path of said beam positioned to transmit a substantially horizontal reflection of said beam once during each revolution thereof to indicate direction.

8. In a device of the character described, in combination, a searchlight having a source of light and a reflector for transmitting a substantially horizontal beam of substantially parallel rays, means for rotating said searchlight continuously whereby said beam indicates position, and a plurality of reflectors in the path of said rotating beam each adapted to transmit a substantially horizontal reflection of said beam once during each revolution thereof, said reflectors being positioned to transmit said reflections in opposite directions along a predetermined course.

In testimony whereof I have affixed my signature.

PRESTON R. BASSETT.